United States Patent
Nakanishi

(10) Patent No.: US 7,911,179 B2
(45) Date of Patent: Mar. 22, 2011

(54) CHARGING/DISCHARGING APPARATUS

(75) Inventor: Toshiaki Nakanishi, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 334 days.

(21) Appl. No.: 12/027,192

(22) Filed: Feb. 6, 2008

(65) Prior Publication Data

US 2008/0191662 A1    Aug. 14, 2008

(30) Foreign Application Priority Data

Feb. 13, 2007    (JP) .................. 2007-032696

(51) Int. Cl.
*H02J 7/00* (2006.01)
*H02J 7/04* (2006.01)

(52) U.S. Cl. ........ 320/118; 320/124; 320/127; 320/138; 307/66

(58) Field of Classification Search .................. 320/118, 320/138

See application file for complete search history.

(56) References Cited

U.S. PATENT DOCUMENTS

| | | | |
|---|---|---|---|
| 6,064,178 A * | 5/2000 | Miller ............................ | 320/117 |
| 6,573,685 B2 | 6/2003 | Nakanishi | |
| 6,762,588 B2 * | 7/2004 | Miyazaki et al. ............. | 320/116 |
| 2001/0054880 A1 * | 12/2001 | Haraguchi et al. ............ | 320/134 |
| 2003/0057776 A1 | 3/2003 | Takase | |
| 2006/0103351 A1 * | 5/2006 | Tanigawa et al. ............. | 320/118 |

FOREIGN PATENT DOCUMENTS

| | | |
|---|---|---|
| JP | 6-205540 A | 7/1994 |
| JP | 2002-15781 A | 1/2002 |
| JP | 2003-23736 A | 1/2003 |
| JP | 2003-95039 A | 4/2003 |
| JP | 2003-189493 A | 7/2003 |
| JP | 2005-151740 A | 6/2005 |

OTHER PUBLICATIONS

Notice of Grounds for Rejection (JP) mailed Jun. 22, 2010, issued in corresponding Japanese Application No. 2007-032696, filed Feb. 13, 2007.

* cited by examiner

*Primary Examiner* — Edward Tso
*Assistant Examiner* — Yalkew Fantu
(74) *Attorney, Agent, or Firm* — Christensen O'Connor Johnson Kindness PLLC

(57) ABSTRACT

A charging/discharging apparatus for simultaneously charging or discharging multiple battery blocks forming a battery pack individually or at one time is provided at low cost. The charging/discharging apparatus includes a group of conductors for connecting one line each respectively to both ends of a group of battery blocks connected in series forming a battery pack and a connection point between battery blocks, a group of discharging circuits mutually connected in series and connected in parallel to battery blocks via the conductors and each disposed at every battery block for discharging the battery block, a group of charging circuits mutually connected in series and connected in parallel with the discharging circuits and the battery blocks via the conductors and each disposed at every battery block for charging the battery block, and a charging/discharging control unit for instructing at least one selected discharging circuit to perform discharging from the group of discharging circuits or one selected charging circuit to perform charging from the group of charging circuits.

1 Claim, 2 Drawing Sheets

|  | FIRST PERIOD | SECOND PERIOD | THIRD PERIOD | FOURTH PERIOD | FIFTH PERIOD |
|---|---|---|---|---|---|
| SWa1 | 1 | 1 | 1 | 1 | 1 |
| SWa2 | 1 | 1 | 1 | 1 | 1 |
| SWa3 | 1 | 1 | 1 | 1 | 1 |
| ⋮ | ⋮ | ⋮ | ⋮ | ⋮ | ⋮ |
| SWan+1 | 1 | 1 | 1 | 1 | 1 |
| SWd1 | 1 | 0 | 0 | 0 | 1 |
| SWd2 | 0 | 1 | 0 | 0 | 0 |
| SWd3 | 1 | 0 | 0 | 0 | 1 |
| ⋮ | ⋮ | ⋮ | ⋮ | ⋮ | ⋮ |
| SWdn+1 | 1 | 0 | 0 | 0 | 1 |
| SWc1 | 0 | 0 | 1 | 0 | 0 |
| SWc2 | 0 | 0 | 0 | 1 | 0 |
| SWc3 | 0 | 0 | 1 | 0 | 0 |
| ⋮ | ⋮ | ⋮ | ⋮ | ⋮ | ⋮ |
| SWcn+1 | 0 | 0 | 0 | 1 | 0 |

Fig. 2

CHARGING/DISCHARGING APPARATUS

PRIORITY INFORMATION

This application claims priority from Japanese Patent Application No. 2007-032696 filed on Feb. 13, 2007, which is incorporated herein by reference in its entirety.

BACKGROUND OF THE INVENTION

1. Field of the Invention

The present invention relates to a charging/discharging apparatus for charging or discharging a battery pack.

2. Description of the Related Art

Heretofore, devices have been proposed for charging and discharging individual batteries.

Japanese Patent Laid-Open Publication H06-205540 discloses a charging/discharging apparatus in which are provided an individual charging power supply and a discharging load for individually charging and individually discharging multiple batteries, respectively, for switching batteries to be charged or discharged by switches.

Japanese Patent Laid-Open Publication 2005-151740 discloses a charger, which includes a remaining capacity detecting section for detecting the remaining capacity of an installed battery, a remaining capacity display section for displaying the remaining capacity detected by the remaining capacity detecting section, and a charging power supply for simultaneously charging multiple batteries connected in parallel, capable of detecting the remaining capacity of the battery and then charging the battery.

Japanese Patent Laid-Open Publication 2002-15781 discloses an apparatus for detecting the voltage in battery block units for multiple battery blocks forming a battery pack.

SUMMARY OF THE INVENTION

In a charging/discharging apparatus provided with one charging circuit for individually charging multiple battery blocks forming a battery pack and one discharging circuit for individually discharging the multiple battery blocks, the multiple battery blocks cannot be charged or discharged at one time. Furthermore, when a charging circuit and a discharging circuit are independently provided at every battery block, the component count and cost increase.

It is therefore an object of the present invention to provide at low cost a charging/discharging apparatus for individually and simultaneously charging or discharging multiple battery blocks forming a battery pack.

The charging/discharging apparatus relating to the present invention includes a group of conductors for connecting one line each respectively to both ends of a group of battery blocks connected in series forming a battery pack and a connection point between battery blocks, a group of discharging circuits mutually connected in series and connected in parallel to battery blocks via the conductors and each disposed at every battery block for discharging the battery block, a group of charging circuits mutually connected in series and connected in parallel with the discharging circuits and the battery blocks via the conductors and each disposed at every battery block for charging the battery block, and a charging/discharging control unit for instructing at least one selected discharging circuit to perform discharging from the group of discharging circuits or one selected charging circuit to perform charging from the group of charging circuits.

According to the present invention, the number of conductors required to connect with the battery blocks can be reduced by respectively connecting in series the discharging circuits and the charging circuits and connecting in parallel each charging circuit and the discharging circuit. Thus, a charging/discharging apparatus for individually and simultaneously charging multiple battery blocks forming a battery pack.

BRIEF DESCRIPTION OF THE DRAWINGS

FIG. 2 shows an example of a table that a charging control section references when controlling the on-off state of each switch.

DETAILED DESCRIPTION OF THE PREFERRED EMBODIMENTS

Figure 1:
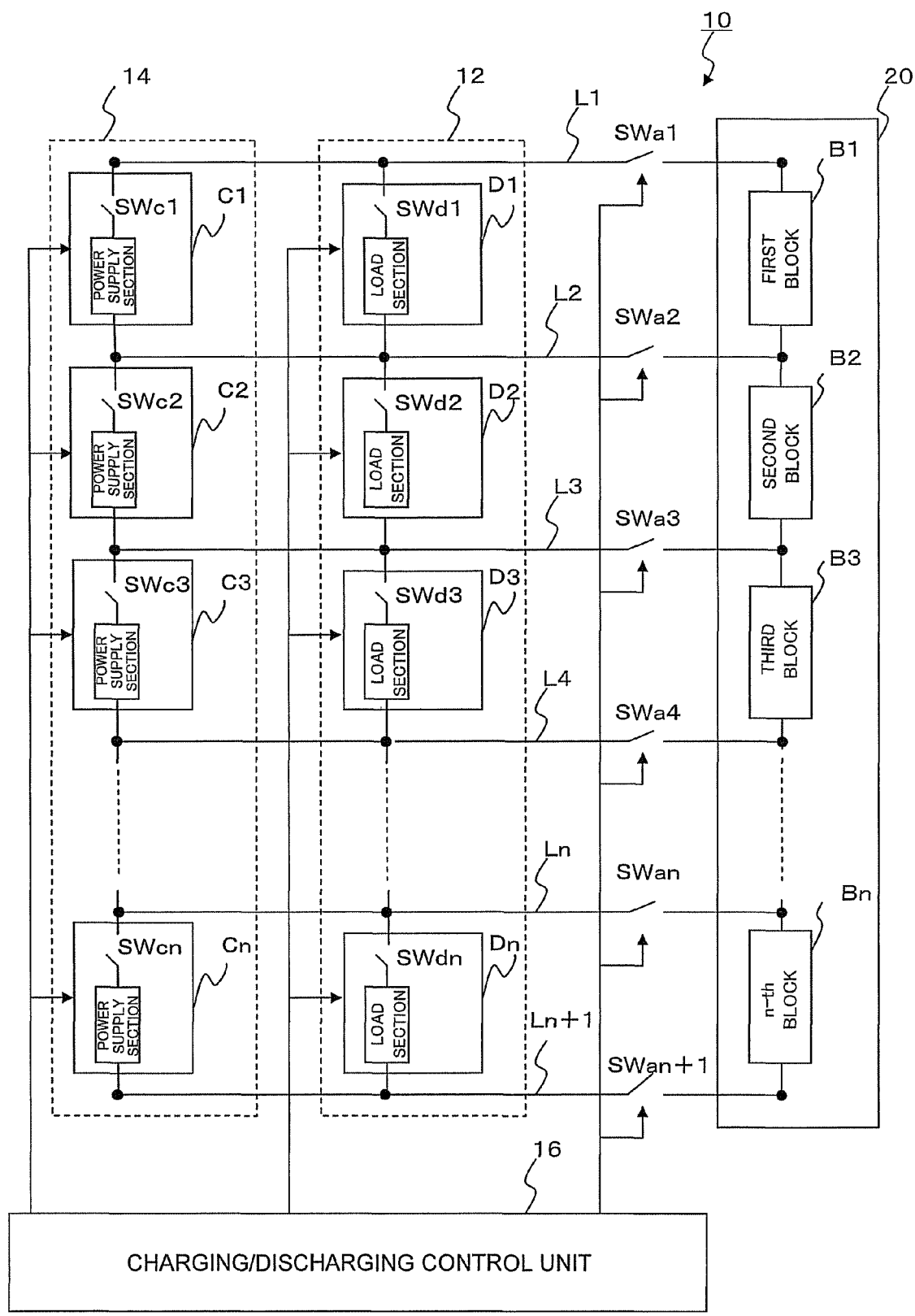
FIG. 1 shows a block diagram of a charging/discharging apparatus relating to the embodiment.

An embodiment specifically showing a best mode for implementing the present invention will be described with reference to the attached drawings.

FIG. 1 shows the connections between a charging/discharging apparatus 10 and a battery pack 20 to be charged/discharged relating to the embodiment.

In FIG. 1, the battery pack 20 is configured by connecting n units of battery blocks B1 to Bn in series. Each battery block is configured by electrically and serially connecting two battery modules. Furthermore, each battery module is configured by electrically and serially connecting six cells. A nickel-metal hydride battery or lithium ion battery can be used for each cell. The numbers of battery blocks, battery modules, and cells are not particularly limited to any quantity. The structure of the battery pack is also not limited to the above-mentioned example.

To each terminal of the battery block B is connected one conductor L. Furthermore, to each terminal of the battery block B are connected in parallel via the conductors L a discharging circuit D and a charging circuit C. The discharging circuits D are mutually connected in series and form a discharging circuit group 12. The charging circuits C are also mutually connected in series and form a charging circuit group 14. A cut-off switch SWa is provided in the conductor L for electrically disconnecting the battery block B from the discharging circuit D and the charging circuit C.

The discharging circuit D is provided with a switch SWd and a load equipped with a constant current circuit. When the switch SWd is turned on, discharging is performed at a constant current for the battery block B that is connected in parallel to the discharging circuit D.

The charging circuit C is provided with a switch SWc. When the switch SWc is turned on, charging is performed for the battery block B that is connected in parallel to the charging circuit C.

A charging/discharging control unit 16 controls the on-off states of the switch SWa provided in the conductor L, the switch SWd provided in the discharging circuit D, and the switch SWc provided in the charging circuit C so that discharging or charging of the predetermined battery block is performed.

For example, to discharge battery block B1, the charging/discharging control unit 16 turns on switches SWa1, SWa2, and SWd1. Furthermore, to charge battery block B2, the charging/discharging control unit 16 turns on switches SWa2, SWa3, and SWc2.

As described hereinabove, connecting in series the discharging circuits D and the charging circuits C, respectively, and connecting in parallel the charging circuits C and the discharging circuits D can reduce the number of conductors L (wire harnesses) required to connect with the battery blocks B.

Furthermore, since each battery block B is individually provided with the discharging circuit D and the charging circuit C, multiple battery blocks B can be charged or discharged individually and simultaneously. For example, the charging/discharging control unit 16 can individually and simultaneously discharge battery block ZB1 and battery block B3 by turning on switches SWa1, SWa2, SWa3, SWa4, SWd1, and SWd3. Thus, the time for charging or recharging multiple battery blocks B can be shortened. Furthermore, variations due to the influence of changes in ambient temperature decrease and differences in performance between battery blocks become clear. Moreover, in the case of a battery pack formed from lithium ion cells, when the overall battery pack is charged at a constant voltage, there is a risk of overcharging a battery block. However, since each battery block B can be controlled to be charged individually in the embodiment, the risk of overcharging a battery block can be decreased.

Due to the circuit configuration, if multiple battery blocks B are to be individually and simultaneously charged or discharged, it is necessary for at least another battery block to be connected between the battery blocks to be charged or discharged. For example, since another battery block is not connected between battery block B1 and battery block B2, individual and simultaneous charging or discharging cannot be performed.

Furthermore, since the discharging circuit D and the charging circuit C are connected in parallel with the battery block B, continuous discharging and charging can be performed for one battery block B. Moreover, a battery block B to be discharged and a battery block B to be charged within the battery pack 20 can be simultaneously set.

Furthermore, a table indicating the on-off timing for each switch may be created in advance and registered into memory and the charging/discharging control unit 16 may reference the table registered into memory to perform switch control operations. As shown in FIG. 2, for example, the table may indicate the on-off state of each switch at a predetermined period. In FIG. 2, "1" indicates the ON state and "0" indicates the OFF state. The charging/discharging control unit 16 references a table, such as the one shown in FIG. 2, at a predetermined period and controls the on-off state of each switch. In this manner, according to the present invention, the discharging circuit D and the charging circuit C are individually provided to each battery block B and by controlling the on-off state of the switches, the appropriate charging or discharging can be performed for an arbitrary battery block B.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A charging/discharging apparatus comprising:
a group of conductors for connecting one line each respectively to both ends of a group of battery blocks connected in series forming a battery pack and a connection point between battery blocks;
a group of discharging circuits mutually connected in series via first switches and connected in parallel to said battery blocks via said conductors and second switches, and each disposed at every battery block for discharging said battery block;
a group of charging circuits mutually connected in series via third switches and connected in parallel to said discharging circuits via said conductors and connected in parallel to said battery blocks via said conductors and said second switches, and each disposed at every battery block for charging said battery block; and
a charging/discharging control unit for allowing at least one discharging circuit selected from said group of discharging circuits with control of turning on at least one of said first switches, or at least one charging circuit selected from said group of charging circuits with control of turning on at least one of said third switches, to perform discharging or charging with control of turning on said second switch connected to said selected discharging circuit or said selected charging circuit.

* * * * *